US011312201B2

(12) United States Patent
Lee et al.

(10) Patent No.: US 11,312,201 B2
(45) Date of Patent: Apr. 26, 2022

(54) METHOD FOR CONTROLLING MOBILE ROBOT AND MOBILE ROBOT THEREFOR

(71) Applicant: LG ELECTRONICS INC., Seoul (KR)

(72) Inventors: Sanghak Lee, Seoul (KR); Nakyeong Kim, Seoul (KR); Sungmin Moon, Seoul (KR); Jeongkyo Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 425 days.

(21) Appl. No.: 16/553,705

(22) Filed: Aug. 28, 2019

(65) Prior Publication Data

US 2019/0381852 A1 Dec. 19, 2019

(30) Foreign Application Priority Data

Jul. 10, 2019 (KR) .................. 10-2019-0083001

(51) Int. Cl.
*B60G 17/019* (2006.01)
*B62D 61/08* (2006.01)
*G05D 1/02* (2020.01)

(52) U.S. Cl.
CPC .......... *B60G 17/019* (2013.01); *B62D 61/08* (2013.01); *B60G 2300/40* (2013.01); *B60G 2400/61* (2013.01); *B60G 2500/30* (2013.01); *G05D 1/021* (2013.01)

(58) Field of Classification Search
CPC .............. B60G 17/019; B60G 2300/40; B60G 2400/61; B60G 2500/30; B62D 61/08; G05D 1/021
USPC ......................................... 280/5.514; 701/37
See application file for complete search history.

(56) References Cited

U.S. PATENT DOCUMENTS

| 8,627,909 | B2 * | 1/2014 | Chang ...................... A61G 5/06 180/19.2 |
| 11,199,853 | B1 * | 12/2021 | Afrouzi ................ G05D 1/0246 |
| 2017/0305261 | A1 * | 10/2017 | Meager ................ A61G 1/0275 |
| 2020/0094645 | A1 * | 3/2020 | Edren ................ B60G 17/0165 |

* cited by examiner

*Primary Examiner* — Toan C To
(74) *Attorney, Agent, or Firm* — Birch, Stewart, Kolasch & Birch, LLP

(57) ABSTRACT

Disclosed is a mobile robot including: at least three wheels; a sensing unit configured to measure a weight of the mobile robot applied to each of the three wheels; a support member connected to at least one of the at least three wheels; a length adjustment member connected to the support member so as to adjust a length of the support member; and a processor control the length adjustment member for effectively controlling a center of mass of a mobile robot. In addition, disclosed are a method implemented by the mobile robot to control a center of mass of the mobile robot, and a non-transitory computer readable storage medium in which a computer program for implementing the method for controlling the center of mass of the mobile robot.

12 Claims, 14 Drawing Sheets

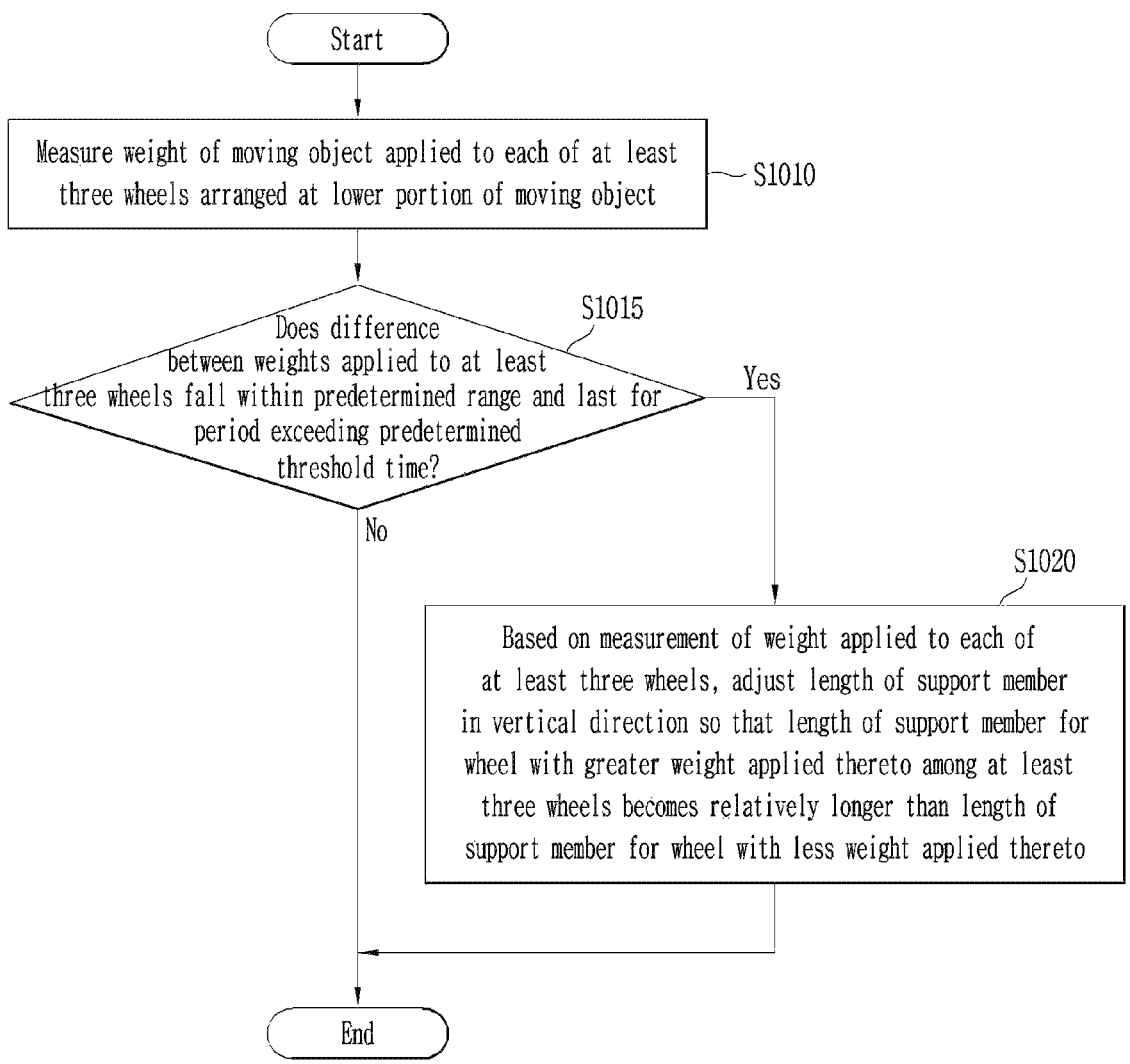

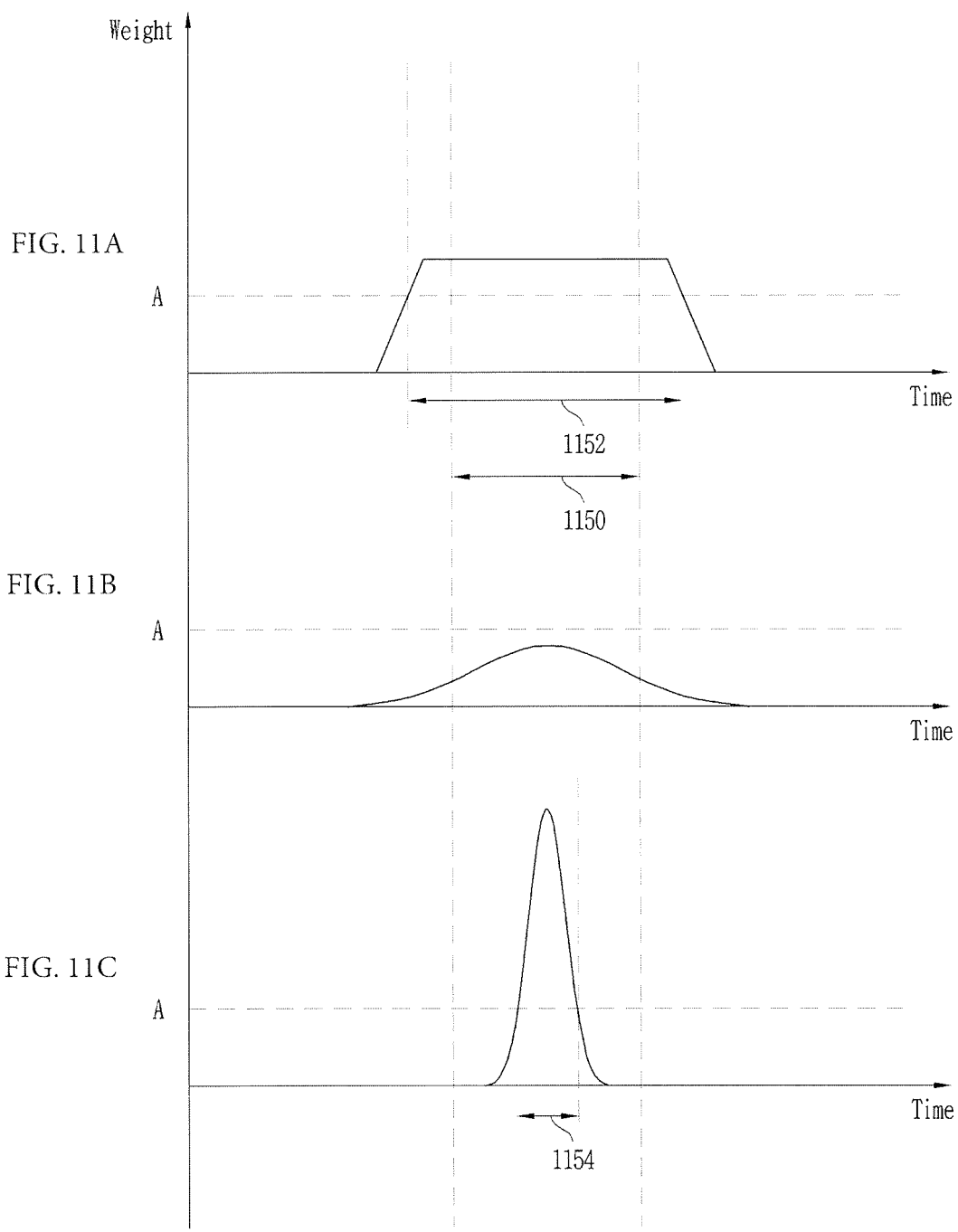

METHOD FOR CONTROLLING MOBILE ROBOT AND MOBILE ROBOT THEREFOR

CROSS-REFERENCE TO RELATED APPLICATION

This application claims the benefit of Korean Patent Application No. 10-2019-0083001, filed on Jul. 10, 2019, in the Korean Intellectual Property Office, the disclosure of which is incorporated herein in its entirety by reference.

BACKGROUND OF THE INVENTION

Field of the Invention

The present invention relates to a method and an apparatus for ensuring traveling stability of a mobile robot capable of moving on the ground.

Related Art

When there is cargo to transport, a user is able to transport, the cargo easily by use of a mobile robot despite a load of the cargo. Such a mobile robot may include a wheel and transport the loads based on an external force applied by a user. Further, the mobile robot may include a receiving part and the user may be easily transport the load of the cargo by accommodating the cargo in the receiving part.

If moving the mobile robot loaded with the cargo in a horizontal direction, the user may easily transport the cargo using the wheel without great friction. If a ground surface forms a predetermined angle, the user may apply a greater external force to the mobile robot, thereby transporting the cargo.

The farther the receiving part of the mobile robot is away from the ground surface, the more distal the center of mass of the mobile robot is from the ground surface. Accordingly, it may be difficult for the mobile robot to keep in balance depending on the ground surface.

SUMMARY OF THE INVENTION

The present invention aims to effectively controlling a center of mass of a mobile robot when the mobile robot is not in balance due to a ground condition or the like, thereby enabled to controlling stability of the mobile robot and preventing the mobile robot from overturning.

In one general aspect to achieve the above object, the present invention may provide a mobile robot including: at least three wheels arranged at a lower portion of the mobile robot; a sensing unit configured to measure a weight of the mobile robot applied to each of the at least three wheels; a support member connected to at least one of the at least three wheels so as to support the mobile robot; a length adjustment member connected to the support member so as to adjust a length of the support member in a vertical direction of a ground surface on which the mobile robot is positioned; and a processor configured to measure a weight applied to each of the at least three wheels by use of the sensing unit and control the length adjustment member so that a length of a support member for a wheel with a greater weight applied thereto among the at least three wheels becomes relatively longer than a length of a support member for a wheel with a less weight applied thereto.

In another general aspect to achieve the above object, the present invention may provide a method for controlling a center of mass of a mobile robot, the method including: measuring a weight of the mobile robot applied to each of at least three wheels arranged at a lower portion of the mobile robot; and based on measurements of the weight applied to each of the at least three wheels, adjusting a length of a support member in a vertical direction so that a length of a support member for a wheel with a greater weight applied thereto among the at least three wheels becomes relatively longer than a length of a support member with a less weight applied thereto.

In yet another general aspect in order to achieve the above object, the present invention may provide a non-transitory computer readable storage medium in which a computer program for implementing a method for controlling a center of mass of a mobile robot.

According to various embodiments described in the present invention, traveling stability of the mobile robot in a sloped ground surface may be ensured.

BRIEF DESCRIPTION OF THE DRAWINGS

FIG. 10 is a flowchart of a procedure of determining whether to adjust a length of a support member based on weights applied to at least three wheels of a mobile robot according to an embodiment of the present invention.

FIGS. 11A, 11B, and 11C are diagrams for comparing a case where a length of a support member is determined to be adjustable according to an embodiment of the present invention and a case where a length of a support member is determined to be not adjustable.

DESCRIPTION OF EXEMPLARY EMBODIMENTS

Figure 1:
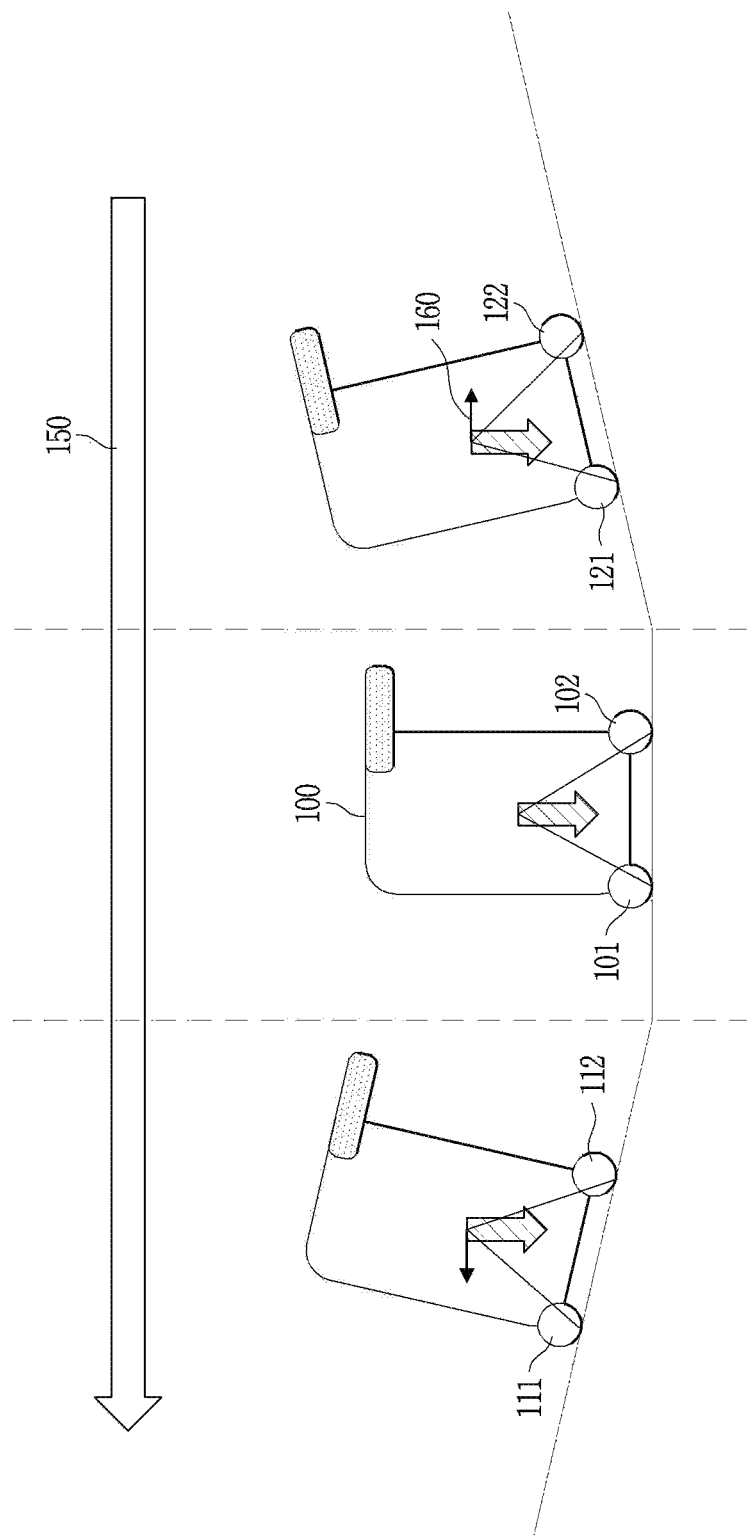
FIG. 1 illustrates changes in the center of mass of a mobile robot according to an embodiment of the present invention while the mobile robot moves on a slope.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

A suffix "unit" used in the following description may be used to refer to elements or components. Use of such a suffix herein is merely intended to facilitate description of the specification, and the suffix itself is not intended to give any special meaning or function.

The drawings and description are to be regarded as illustrative in nature and not restrictive. Like reference numerals designate like elements throughout the specification. In addition, embodiments of the present invention will be described in detail with reference to exemplary drawings. In the drawings, like reference numerals denote like elements. Moreover, detailed descriptions related to well-known functions or configurations will be ruled out in order not to unnecessarily obscure subject matters of the exemplary embodiments.

In the description of the constituent elements of the embodiments of the present disclosure, it is possible to use terms such as first, second, A, B, (a), (b) and the like. These terms are just to distinguish the constituent elements from any other constituent elements but do not limit the nature or sequence or order and the like of corresponding features by the terms. Additionally, it should be also understood that the expression that some constituent element is "connected", "coupled" or "joined" to another constituent element means that some constituent element may be directly connected or joined to another constituent element or is also "connected", "coupled" or "joined" to another constituent element through a further component therebetween.

In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Further, in implementing this application, for convenience of explanation, the component will be described by being subdivided; however, these components may be implemented in a device or a module, or a component may be implemented by being divided into a plurality of devices or modules.

Before describing the present invention, main terms according to the present invention will be described.

The term "support member" may be defined as a member that can be connected to a wheel capable of moving a mobile robot so as to support the mobile robot on the ground. The support member used in the present invention is a member associated to each wheel included in a mobile robot, and thus, the support member may be provided in number identical to the number of wheels included in the mobile robot. The support member used in the present invention can be adjusted in length linearly. The length of the support member can be adjusted in various directions through a hinge.

The term "length adjustment member is a member for adjusting a length of a support member, and each length adjustment member can be connected to a corresponding support member and adjust a length thereof. In another example, the length adjustment member may be arranged to adjust a length of a wheel that is arranged on at least one surface of a front section and a rear section with reference to a moving direction of a mobile robot. In the present invention, the length adjustment member is capable of performing a straight movement at a portion connected to a support member to thereby adjust a length of the support member, and a plurality of length adjustment members arranged in various directions may be combined so that the support member can adjust a length not just in a vertical or horizontal direction but also at various angles. According to an embodiment the length adjustment member may include an actuator linearly creating movement, and it is apparent to those skilled in the art that the length adjustment member includes various types of linear actuator that can cause a connected support member to linearly move, for example, a mechanical actuator, a hydraulic actuator, a pneumatic actuator, a piezoelectric actuator, an electro-mechanical actuator, etc.

The term "driving unit" may be defined as an element for providing a driving force to a wheel so that a mobile robot can automatically move even though a user does not apply an external force. The driving unit may be implemented in various aspects so as to apply driving power to a wheel within a range easily adopted by those skilled in the art.

The term "Artificial Intelligence (AI)" refers to artificial intelligence or a field for studying a methodology therefor. The term "machine learning" refers to a field for defining various problems addressed in the AI field and studying a methodology for solving the problems. The machine learning may be defined as an algorithm that constantly performs a specific task and thus improves performance with respect to the specific task.

The term "artificial neural network (ANN)" may include an input layer, an output layer, and selectively one or more hidden layers. Each layer includes one or more neurons, and the artificial neural network may include a synapse that connects one neuron and another neuron. In an artificial neural network, each neuron may output a function value with respect to input signals, a weight, and a deviation which are input through a synapse.

Artificial Intelligence may refer to overall models used in machine learning and having problem solving capabilities, each model which consists of artificial neurons (nodes) that forms a network through synapse connection. The artificial neural network may be defined a connection pattern between neurons on different layers, by a learning procedure of updating a model parameter, and by an activation function of generating an output value.

The model parameter refers to a parameter determined through learning, and may include a weight of synapse connection, a deviation of neurons, etc. In addition, a hyper parameter refers to a parameter that needs to be set before learning by a machine learning algorithm, and may include a learning rate, a reputation number, a mini-batch size, an initialization function, etc.

The purpose of learning of the artificial neural network may be determining a model parameter that minimizes a loss function. The loss function may be used as an index for determining an optimal model parameter for a learning process in the artificial neural network.

The machine learning may be classified into supervised learning, unsupervised learning, and reinforcement learning.

The map learning refers to a method for training an artificial neural network with a given label for training data, and the label may refer to an answer (or a result value) which the artificial neural network needs to infer when the training data is input to the artificial neural network. The unsupervised learning may refer to a method for training an artificial neural network without a given label for training data. The reinforcement learning may refer to a learning method that enables an agent, defined in a certain environment, to select an action or an order of actions so as to maximize accumulative rewards in each state.

Machine learning implemented as a Deep Neural Network (DNN) including a plurality of hidden layers among artificial neural networks may be referred to as deep learning, and the deep learning is a part of machine learning. Hereinafter, the meaning of the machine learning includes the deep learning.

The term "self-driving" or "autonomous-driving" refers to a technology of driving autonomously, and a self-driving or autonomous-driving vehicle refers to a vehicle capable of driving without a user's manipulation or minimum manipulation.

For example, self-driving may include a technology of maintaining the currently drive lane, a technology of automatically controlling a speed, such as adaptive cruise control, a technology of automatically driving along a predetermined path, a technology of automatically set a path when a destination is set, etc.

A vehicle may encompasses a vehicle having only an internal combustion engine, a hybrid vehicle having both an internal combustion engine and an electric motor, and an electric vehicle having only an electric motor, and may include not just a passenger car but also a train, a motorcycle, etc.

In this case, the self-driving vehicle may be regarded a robot having a self-driving function.

The term "eXtended Reality (XR)" is the generic term that refers to Virtual Reality (VR), Augmented Reality (AR), and Mixed Reality (MR). VR technology provides a real-world object or background only as a CG image, AR technology provides a virtually created CG image over a real-world object image, and MR technology is a computer graphic technology for mixing and combining virtual objects in real world.

The MR technology is similar to the AR technology in that a real-world object and a virtual object are displayed together. Yet, the MR technology is different from the AR technology in that a virtual object and a real-world object are used with equal characteristics in the MR technology, whilst a virtual object is used to supplement a real-world object in the AR technology.

The XR technology may apply to a Head-Mount Display (HMD), a Head-Up Display (HUD), a mobile phone, a tablet PC, a laptop computer, a desktop computer, a TV, a digital signage, etc., and a device with the XR technology applied may be referred to as an XR device.

Hereinafter, various embodiments of the present invention will be described with reference to the accompanying drawings.

FIG. 1 illustrates changes in the center of mass of a mobile robot 100 according to an embodiment of the present invention while the mobile robot 100 moves on a slope. The shape of the mobile robot 100 in FIG. 1 is understood as being viewed from the side.

According to an embodiment, the mobile robot 100 may easily move by its own driving power through wheels 101 and 102, which is capable of rotating about a shaft positioned between the wheels 101 and 102, or by an external force applied by a user.

According to an embodiment, in order for the mobile robot 100 to keep remaining on a slope, an additional force is required. For example, if the mobile robot 100 is positioned on an uphill slope, a wheel 112 arranged in a rear section with reference to a moving direction 150 is subject to greater pressure than a wheel 111 arranged in a front section. Thus, in order to prevent the mobile robot 100 from overturning in a direction opposite to the moving direction 150, a user needs to move the center of mass of the mobile robot 100 in the moving direction 150.

According to another embodiment, if the mobile robot 100 is positioned on a downhill slope, a wheel 121 arranged in a rear section with reference to the moving direction 150 is subject to greater pressure than a wheel 122 arranged in a front section. Thus, in order to prevent the mobile robot 100 from overturning, a user needs to move the center of mass of the mobile robot 100 in a direction opposite to the moving direction 150.

However, the greater the inclination of an area on which the mobile robot 100 is positioned, the greater the external force is required to be applied by a user in the direction opposite to the moving direction. The greater the weight of the mobile robot 100, the more difficult it would be for the user to control the center of mass of the mobile robot 100.

In order to solve this problem, the present invention may adjust a height of the mobile robot 100 from a ground surface, so that the center of mass of the mobile robot 100 can be located in a stable region.

Figure 2:
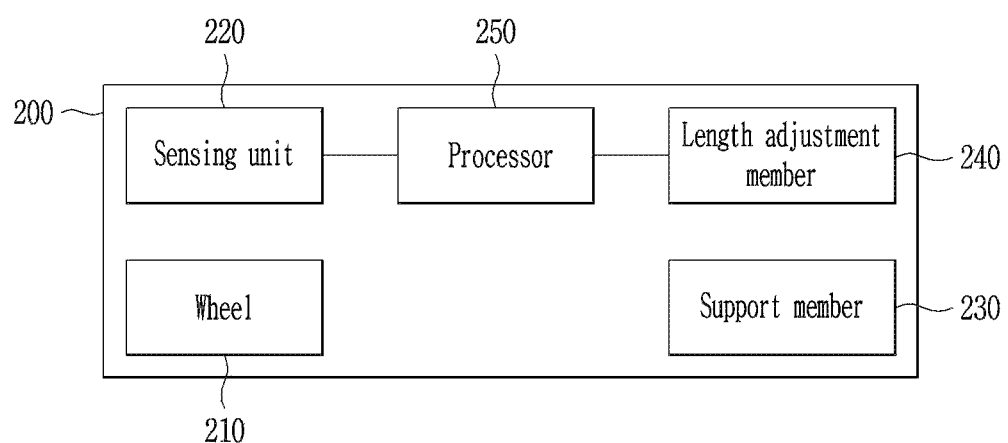
FIG. 2 illustrates a block diagram of a mobile robot capable of controlling the center of mass thereof according to an embodiment of the present invention.

FIG. 2 illustrates a block diagram of a mobile robot 200 capable of controlling the center of mass of the mobile robot 200 according to an embodiment of the present invention. FIG. 2 illustrates a relationship of elements used in the mobile robot 200 or a relationship by which predetermined information is transmitted or received by a processor 250. Accordingly, a driving mechanism according to physical connection inside the mobile robot 200 can be understood using the following description or embodiments.

According to an embodiment, the mobile robot 200 may include: at least three wheels 210 arranged at a lower portion of the mobile robot 200 so as to move the mobile robot; a sensing unit 220 for measuring a weight of the mobile robot 200 applied to each of the at least three wheels 210; a support member 230 connected to at least one of the at least three wheels 210 to support the mobile robot 200; a length adjustment member 240 connected to the support member 230 to adjust a length of the support member 230 in a vertical direction; and a processor 250 configured to receive information on the weights applied to the at least three wheels 210 from the sensing unit 220 and control the length adjustment member 240 to adjusting a length of the support member based on the received information.

According to an embodiment, the at least three wheels 210 may not be arranged in a straight line but may be arranged at a lower end of the mobile robot 200 so that a line connecting the at least three wheels 210 form a 2D plane. For example, in a case where the number of wheels 210 is three, a front section and a rear section may be divided with reference to a moving direction of the mobile robot 200 and one wheel 210 may be arranged in the front section and two wheels 210 may be arranged in the rear section. However, the exemplary number and arrangement of the wheels are merely for explaining that the at least three wheels 210 are arranged to form a 2D plane, and thus, the present invention are not limited the exemplary number and arrangement of the wheels.

According to an embodiment, the sensing unit 220 may measure a weight of the mobile robot 200 applied to each of the at least three wheels 210 and transmit the measurement to the processor 250. The sensing unit 220 capable of measuring a weight can be implemented in various shapes within a range which those skilled in the art can easily realize. According to an embodiment, the sensing unit 220 may be arranged between the at least three wheels 210 and the support member 230, and, in this case, the sensing unit 220 may be provided in number identical to the number of the at least three wheels 210. According to an embodiment, the sensing unit 220 may include various elements capable of measuring a weight applied to each of the at least three wheels 210, based on pressure applied to a one-dimensional, two-dimensional, or three-dimensional direction.

According to an embodiment, the support member 230 is connected to the at least three wheels 210 to support the mobile robot 200 on the ground. According to an embodiment, the support member 230 may be connected to each of the at least three wheels 210. In this case, the number of support members 230 may be identical to the number of the at least three wheels 210. According to an embodiment, in a case where a front section and a rear section are divided with reference to a moving direction of the mobile robot 200, the length adjustment member 240 may be implemented as at least one length adjustment member 240 for relatively adjusting lengths of the respective support members 230 disposed in the front section and the rear section.

According to an embodiment, a length of the support member 230 is a distance by which a wheel 210 is spaced apart from the mobile robot 200, and it may be understood that a maximum length and a minimum length adjustable by the length adjustment member 240 are considered.

According to an embodiment, the support member 230 and the length adjustment member 240 may be integrally formed.

According to an embodiment, the processor 250 may control elements included in the mobile robot 200 to perform various embodiments that can be performed by various elements included in the mobile robot 200. That is, in various embodiments described below, it is understood that operation of the mobile robot 200 is based on a control operation by the processor 250. According to an embodiment, the processor 250 may include at least one of an RAM, an ROM, a CPU, a GPU (Graphic Processing Unit), or a BUS, and they may be connected to each other.

According to an embodiment, the processor 250 may control the length adjustment member 240 so as to adjust the length of the support member 230 of the mobile robot 200 based on a weight measured by the sensing unit 220, so that a center of mass of the mobile robot 200 can be controlled stably. According to an embodiment, the processor 250 may adjust a length of the support member 330*c* in a direction in which a deviation between weights of the at least three wheels 210 measured by the sensing unit 220 is reduced. According to an embodiment, the processor 250 may control the length adjustment member 240 in a direction in which the center of mass of the mobile robot 200 does not move out of a line connecting the at least three wheels 210 on a plane orthogonal to a direction of gravity. As such, the processor 250 may control the length adjustment member 240 so as to perform an operation for controlling the center of mass of the mobile robot 200, and various embodiments where the length adjustment member 240 is controlled will be hereinafter described with various examples.

According to an embodiment, the processor 250 may calculate a point at which the center of mass of the mobile robot 200 is located based on a weight measured by the sensing unit 220. According to an embodiment, the processor 250 may be aware of arrangement shape of at least one wheel 210 of the mobile robot 200 in advance and may calculate the center of mass of the mobile robot 200 based on a weight measured by the sensing unit 220 and arrangement shape of the at least three wheels 210. For example, as the center of mass of the mobile robot 200 viewed from above in a vertical direction is determined in relation with arrangement shape of the at least three wheels 210, it may be possible to determine as to whether the center of mass of the mobile robot 200 is located within a stable region formed by the at least three wheels 210. A method for calculating the center of mass of the mobile robot 200 by the processor 250 may include various methods that can be easily made by those skilled in the art pertaining to the same technical field of the present invention.

According to an embodiment, in order to provide electric power required to operate various elements including the sensing unit 220, the length adjustment member 240, and the processor 250 of the mobile robot 200, the mobile robot 200 may receive electric power from an external resource or may utilize a battery (not shown) included in the mobile robot 200.

Figure 3:
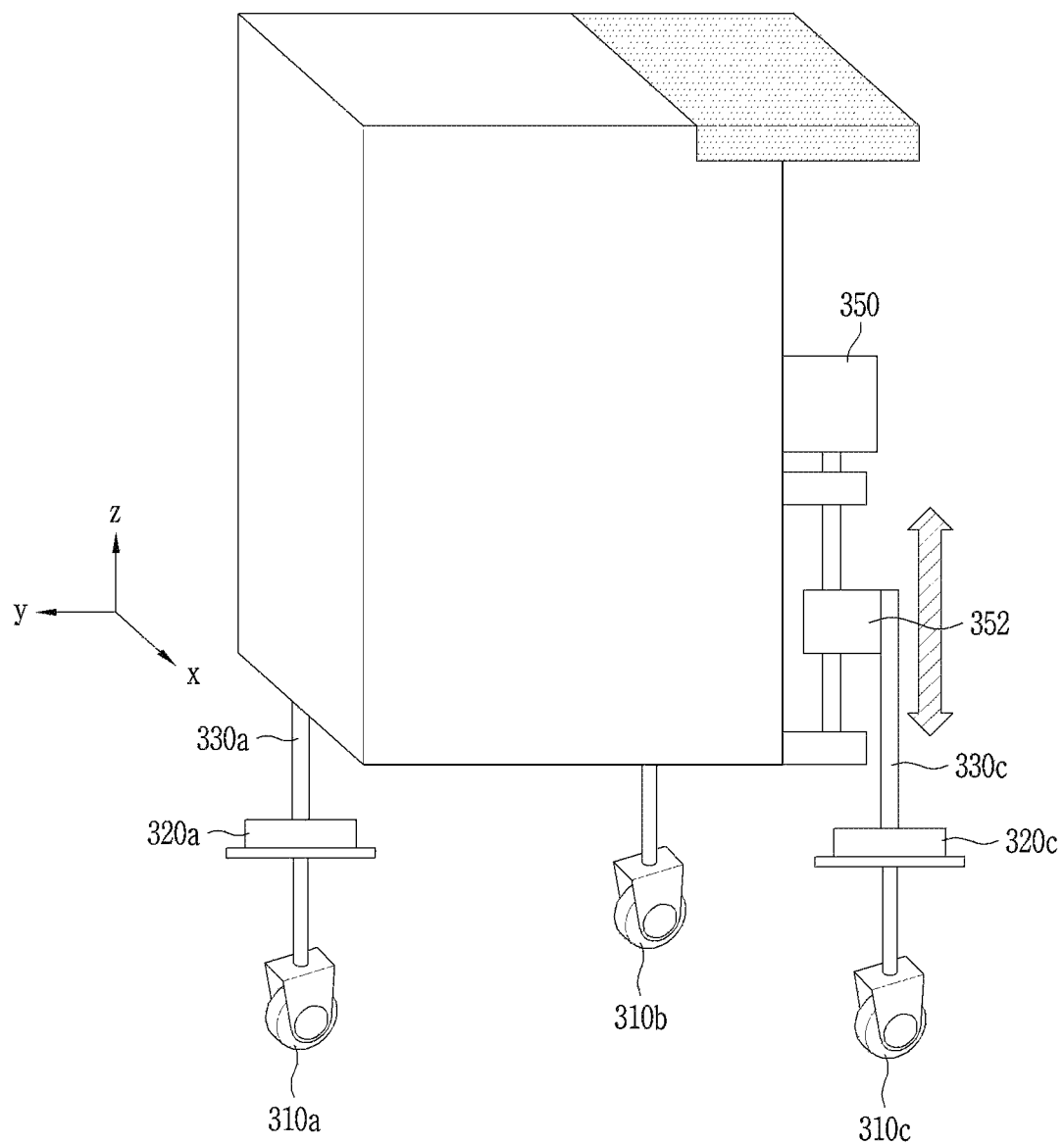
FIG. 3 illustrates an example of a mobile robot capable of controlling the center of mass thereof according to an embodiment of the present invention.

FIG. 3 illustrates an example of a mobile robot 300 capable of controlling a center of mass thereof according to an embodiment of the present invention. The mobile robot 300 of FIG. 3 corresponds to an example of the mobile robot 200 implemented by the elements included in the block diagram of FIG. 2.

Referring to FIG. 3, a mobile robot 300 may include; at least three wheels 310*a*, 310*b*, and 310*c* arranged at a lower portion of the mobile robot 300; sensing units 320*a*, 320*b*, and 320*c* arranged at the respective wheels; support members 330*a* and 330*c* supporting the respective wheels; and a length adjustment member 350 capable of adjusting lengths of the support members 330*a* and 330*c* in a vertical direction 340. For convenience of explanation, the number of wheels included in the mobile robot 300 is set to three, and the support member 330*c* and the length adjustment member 350 for one wheel 310*c* are described to explain a method for arranging the support members 330*a* and 330*c* and the length adjustment member 350. Thus, the number of elements included in the mobile robot 300 of the present invention and arrangement of the elements should not be interpreted to be limited to the example shown in FIG. 3, and the example of FIG. 3 should be understood as an example for explaining features of the present invention.

According to an embodiment, the mobile robot 300 may be divided into elements 310*a*, 320*a*, and 330*a* arranged in a front section of the mobile robot 300 with reference to a moving direction of the mobile robot 300 (that is, the Y-axis direction) and elements 310*b*, 310*c*, 320*c*, 330*c*, and 350 arranged in a rear section of the mobile robot 300. The wheels 310*b* and 310*c* arranged in the rear section may be supported by the respective support members 330, and lengths of the wheels 310*b* and 310*c* may be controlled by a single length adjustment member 350. The lengths of the wheels 310*b* and 310*c* may be adjusted individually by length adjustment members respectively connected to support members 330. According to an embodiment, the support members 330 may be connected to a table 352 movable by the length adjustment members 350 and thus the lengths of the support members 330 may be adjusted in a vertical direction. Here, the vertical direction is a direction vertical to a ground surface on which the mobile robot 200 is positioned, and the vertical direction may refer to a direction orthogonal to a predetermined plane formed by the at least three wheels 310a, 310b, and 310c.

According to an embodiment, the processor 250 of the mobile robot 300 may measure a weight of the mobile robot 300 applied to each wheel using the sensing units 320a and 320c of the wheels 310a, 310b, and 310c and adjust a length of the support member 330c using the length adjustment member 350. According to an embodiment, the length of the support member 330c for the wheels 310b and 310c arranged in the rear section with reference to the moving direction of the mobile robot 300 may be adjusted by the length adjustment member 350. In a case where a length of the support member 330c is extended by the length adjustment member 350, a height of the rear section of the mobile robot 300 is increased to be higher than a height of the front section, and accordingly, a center of mass of the mobile robot 300 positioned on an uphill slope may be moved relatively toward the front section, compared to before the length of the support member 330c is extended.

Figure 4:
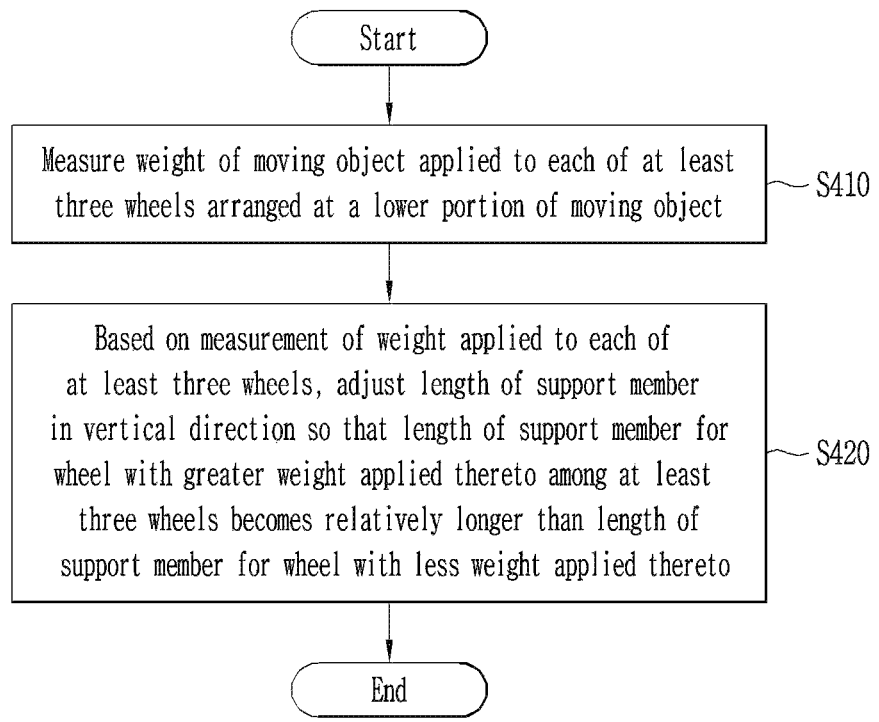
FIG. 4 is a flowchart of a method for controlling a center of mass of a mobile robot according to an embodiment of the present invention.

FIG. 4 is a flowchart of a method for controlling a center of mass of the mobile robot 200 according to an embodiment of the present invention.

In step S410, the mobile robot 200 may measure weights of the mobile robot 200 applied to at least three wheels 210, arranged at a lower portion of the mobile robot 200, through the sensing unit 220 according to an embodiment. Using a weight measured at each wheel 210, the processor 250 may determine a wheel toward which mass is biased, that is, a direction toward which a center of mass of the mobile robot 200 is biased.

In step S420, based on a weight applied to each of the at least three wheels 210, which is measured in the step S410, the processor 250 of the mobile robot 200 may control the length adjustment member 240 so as to adjust a length of a support member in a vertical direction, so that a length of a support member 230 for a wheel with the greatest weight applied thereto among the at least three wheels 210 is extended longer relatively than a length of a support member 230 for a wheel with the smallest weight applied thereto. By adjusting, in the vertical direction, a length of a support member 230 for a wheel 210 toward which a weight of the mobile robot 200 positioned on a slope is biased, it is possible to prevent the mobile robot 200 from overturning due to a small amount of external force.

According to an embodiment, the processor 250 may control the length adjustment member 240 so that equal weights can be applied to the at least three wheels 210. According to an embodiment, a center of mass of the mobile robot 200 positioned on a level ground may not be substantially located at the center of arranged positions of the at least three wheels 210. In this case, a weight applied to each of the at least three wheels 210 may differ even on the level ground. Thus, in a case where the mobile robot 200 is positioned on a slope and thereby a center of mass thereof is substantially located at the center of arranged positions of the at least three wheels 210, it may be not necessary to adjust a length of the support member 230.

Figure 5:
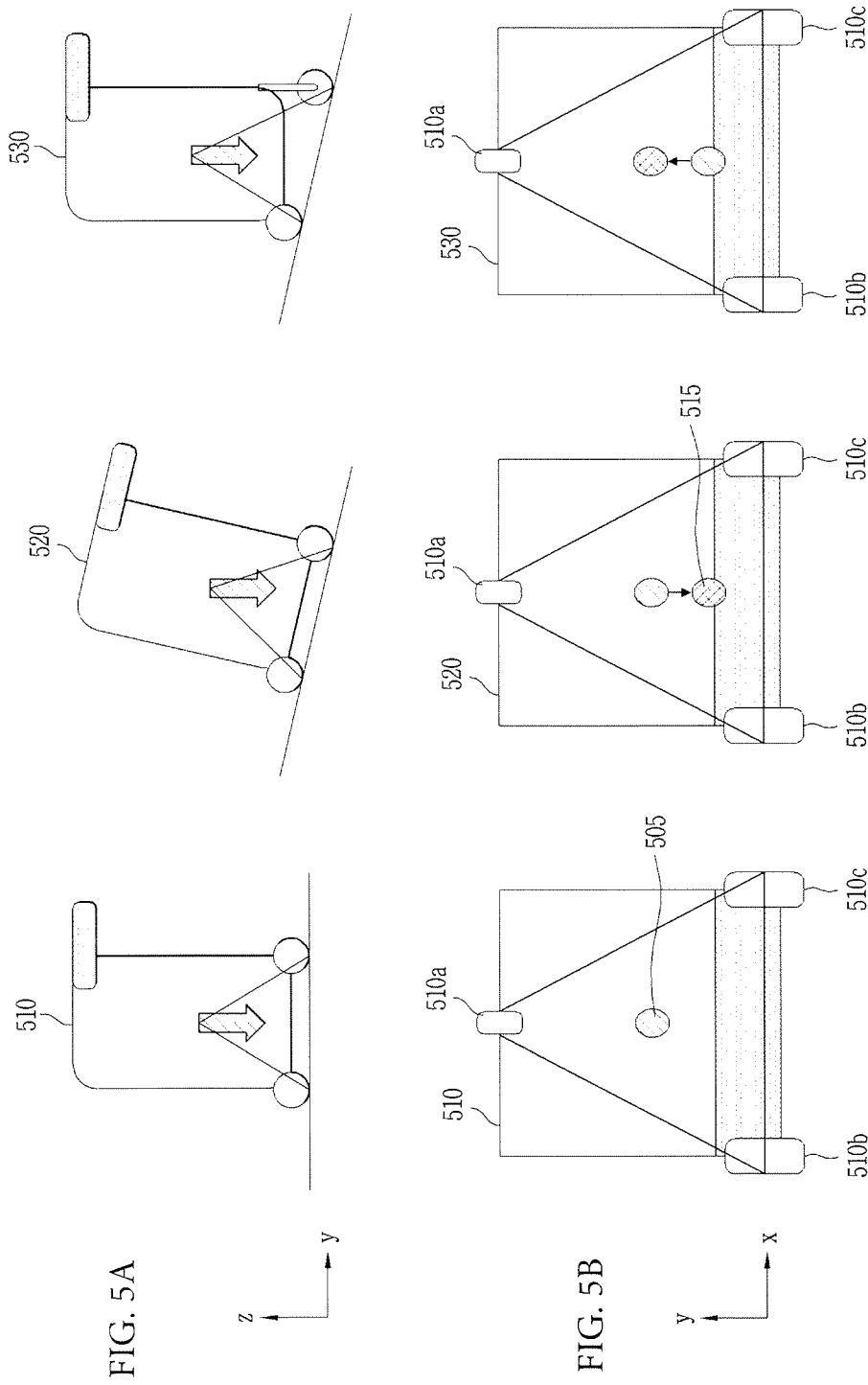
FIGS. 5A and 5B illustrate a procedure of controlling a center of mass of a mobile robot by adjusting a height of a support member for a wheel in a vertical direction by the mobile robot.

FIGS. 5A and 5B illustrate a procedure of controlling a center of mass of the mobile robot 200 by adjusting a height of a support member 230 for a wheel 210 in a vertical direction by the mobile robot 200. According to an embodiment, FIG. 5A illustrates the mobile robot 200 viewed from a side when the mobile robot 200 moves from a level ground to an uphill slope, and FIG. 5B illustrates the mobile robot 200 viewed from a plane in the same situation. Mobile robots 510, 520, and 530 in situations shown in FIG. 5 may correspond to the mobile robot 200 of FIG. 2.

According to an embodiment, wheels 510a, 510b, and 510c in the mobile robot 510 moving on a level ground are in horizontal to each other, and, when viewed on the level ground, a center of mass 505 of the mobile robot 510 may be positioned within a region formed by connecting the wheels 510a, 510b, and 510c.

According to an embodiment, as for the mobile robot 520 positioned on an uphill slope, weights applied to the wheels 510b and 510c arranged in a rear section may be greater than a weight applied to the wheel 510a arranged in a front section, and this is on the basis of the fact that the weight applied to the wheel 510a arranged in the front section is reduced whilst the weights applied to the wheels 510b and 510c arranged in the rear section is increased. As such, when the mobile robot 520 enters the uphill slope, a center of mass 515 of the mobile robot 520 may be biased relatively further rearward compared to the center of mass 505 of the mobile robot 510 positioned on a level ground, and this may be determined by the processor 250 on the basis that weights applied to the wheels 510b and 510c arranged in the rear section is greater than a weight applied to the wheel 510a arranged in the front section.

According to an embodiment, a biased center of mass of the mobile robot 530 may be controlled by extending a length of a support member 230 for the rear section wheels 510b and 510c with a relatively greater weight applied thereto. To this end, the processor 250 may control the length adjustment member 240 so that the center of mass 515 of the mobile robot 530 positioned on the uphill slope moves again toward a center of mass 505 of the mobile robot 530 positioned on the level ground. In this case, a deviation between weights applied to the wheels 510a, 510b, and 510c of the mobile robot 530 may be reduced by adjusting a length of the support member 230 of the mobile robot 530.

According to an embodiment, a change in the center of mass (see FIG. 5B) may be visually or audibly output to a user through an output unit (not shown) of the mobile robot 200. According to an embodiment, a current center of mass and a stable region may be displayed in real time on a display (not shown) attached to the mobile robot 200. According to an embodiment, in a case where the center of mass of the mobile robot 200 is biased somewhat toward a part of the wheel 210 and thereby positioned within a predetermined distance from the stable region, an alarm signal may be output audibly so that a user can be aware of the situation.

According to an embodiment, driving power may be provided to at least one of the at least three wheels 210, and the processor 250 may control the length adjustment member 240 so as to adjust a length of the support member 230 for the wheel to which the driving power is provided. According to an embodiment, the mobile robot 200 may further include a driving unit for providing driving power to at least one of the at least three wheels 210, and driving power may be provided to the wheel 210 by the driving unit.

Figure 6:
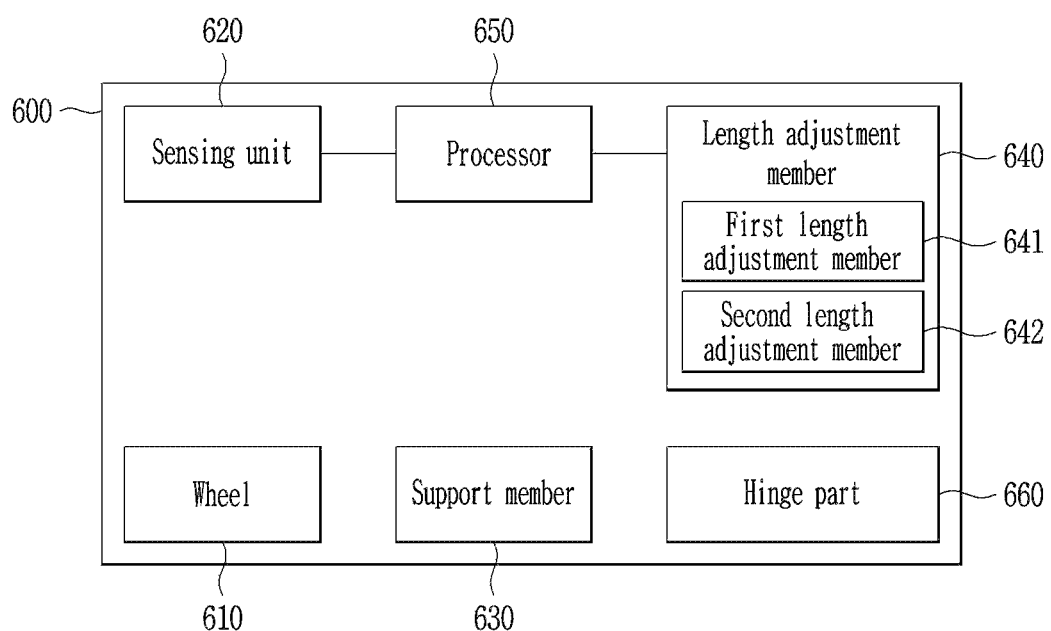
FIG. 6 is a block diagram of a mobile robot capable of adjusting a length of a support member in vertical and horizontal directions.

FIG. 6 is a block diagram of a mobile robot 600 capable of adjusting a length of a support member 630 in vertical and horizontal directions. According to an embodiment, features of a wheel 610 and a sensing unit 620 shown in FIG. 6 may be identical or similar to features of the wheel 210 and the sensing unit 220 shown in FIG. 2, and thus, a detailed description thereof is herein omitted.

According to an embodiment, a length adjustment member 640 may include a first length adjustment member 641 for adjusting a length of the support member 630 in the vertical direction, and a second length adjustment member 642 for adjusting a length of the support member 630 in the horizontal direction. According to an embodiment, a length of the support member 630 may be adjusted in the vertical direction by the first length adjustment member 641 and may be adjusted in the horizontal direction by the second length adjustment member 642. To this end, a hinge part 660 for adjusting an angle of the support member 630 may be included additionally. The number and arrangement of hinges parts 660 may be implemented in various ways for moving the support member 630 in the horizontal and vertical direction. Hereinafter, a detailed description is provided with reference to FIG. 7.

Figure 7:
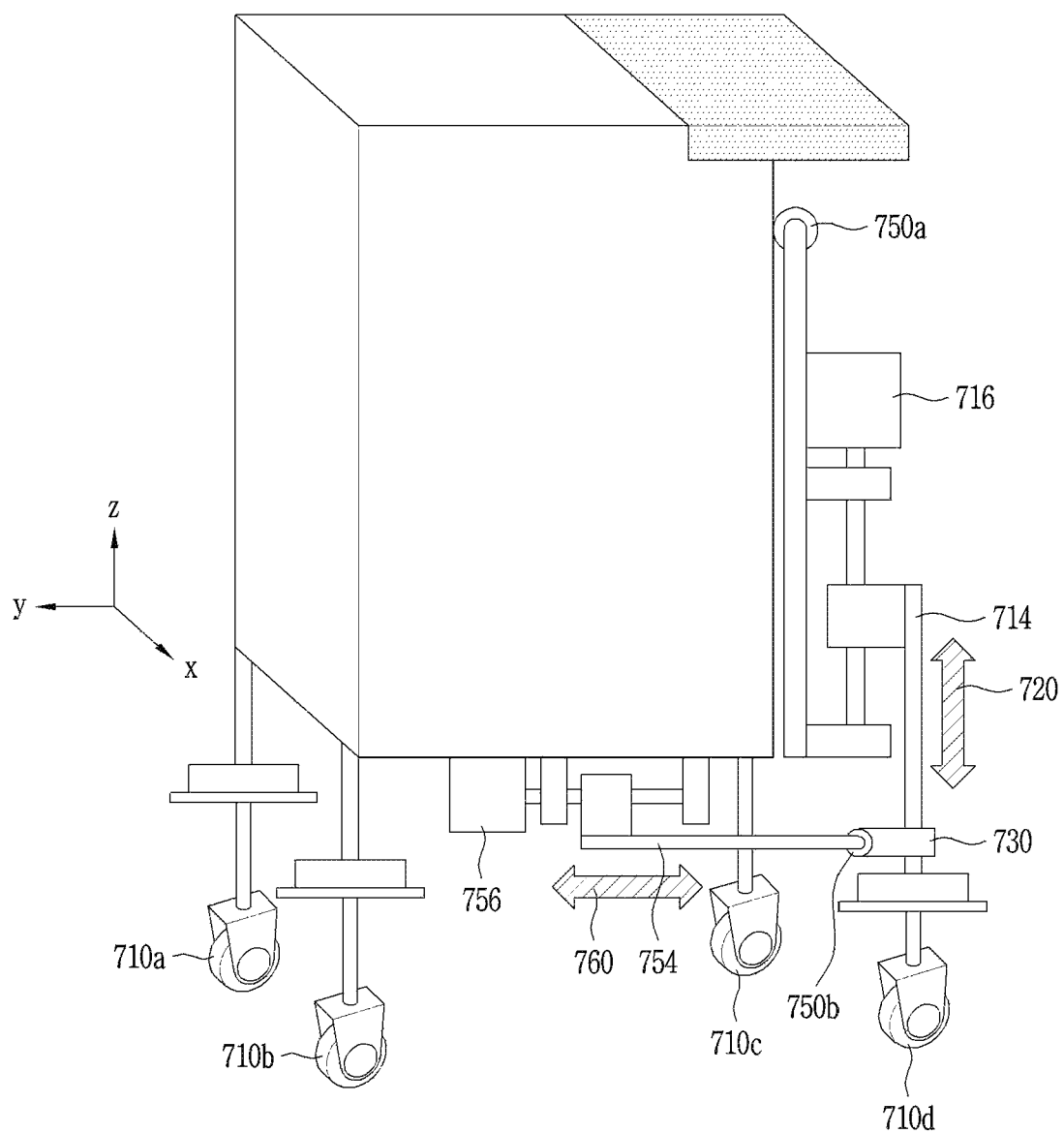
FIG. 7 shows an example of a mobile robot capable of adjusting a length of a support member in vertical and horizontal directions according to an embodiment of the present invention.

FIG. 7 shows an example of a mobile robot 700 capable of adjusting a length of a support member in vertical and horizontal directions according to an embodiment of the present invention.

FIG. 7 shows an example of the mobile robot 300 capable of controlling a center of mass thereof according to an embodiment of the present invention. The mobile robot 700 of in FIG. 7 corresponds to an example of the mobile robot 200 implemented by the elements included in the block diagram of FIG. 6.

Referring to FIG. 7, the mobile robot 300 may include four wheels 710a, 710b, 710c, and 710d arranged at a lower portion thereof, and the sensing unit 620 and the support member 630 may be connected to each wheel. According to an embodiment, the mobile robot 700 may include a first length adjustment member 716 for adjusting a length of the support member 630 in a vertical direction, and a second length adjustment member 756 for adjusting a length of the support member 630 in a horizontal direction. According to an embodiment, the horizontal direction may be a direction vertical to the vertical direction in which a length of the first length adjustment member 716 is adjusted. For example, the horizontal direction may correspond to a direction parallel to a direction in which the mobile robot 700 moves on the ground. According to an embodiment, a wheel associated with the first length adjustment member 716 and the second length adjustment member 756 (for example, a wheel 710c or 710d) may include a support member 714 connected to the first length adjustment member 716 and a support member 754 connected to the second length adjustment member 756. That is, each of the support members 714 and 754 may be connected to a table that is movable by the first length adjustment member 716 and the second length adjustment member 756.

According to an embodiment, the first length adjustment member 716 may be connected to the support member 714 and thereby adjust a length of the support member 630 in the vertical direction. According to an embodiment, a connecting part 730 for adjusting a length of the support member 714 in a horizontal direction 760 may not be fixed to the support member 714, and, in this case, it is not necessary to drive the second length adjustment member 756 in order to change the length of the support member 714 in a vertical direction 720.

According to an embodiment, in order to extend the length of the support member 714 not just in the vertical direction 720 but also in the horizontal direction 760, the support members 714 and 754 may be adjusted together by the first length adjustment member 716 and the second length adjustment member 756. According to an embodiment, in a case where the support member 754 is moved in the horizontal direction 760 by the second length adjustment member 756, a length of the support member 714 having received a force through the connecting part 730 may be adjusted in the vertical direction 720 and in the horizontal direction 760 at the same time.

According to an embodiment, a hinge part 750a may be connected to the first length adjustment member 716, and, on the basis of this connection, a length of the support member 714 may be adjusted even in the horizontal direction 760. In another example, the hinge part 750a of FIG. 7 may be positioned between the first length adjustment member 716 and the support member 714.

According to an embodiment, a hinge part 750b may be positioned between the support member 754 for the second length adjustment member 756 and the connecting part 730, and, accordingly, a length of the support member 714 having received a force from the second length adjustment member 756 may be adjusted in the horizontal direction 760. In another example, the hinge part 750b of FIG. 7 may be further positioned between the support member 754 and the second length adjustment member 756.

However, the numbers and arrangement of elements shown in FIG. 7 are illustrated exemplarily for convenience of explanation, and it should not be interpreted that an exemplary embodiment of the mobile robot 600 is limited to the example shown in FIG. 7.

Figure 8:
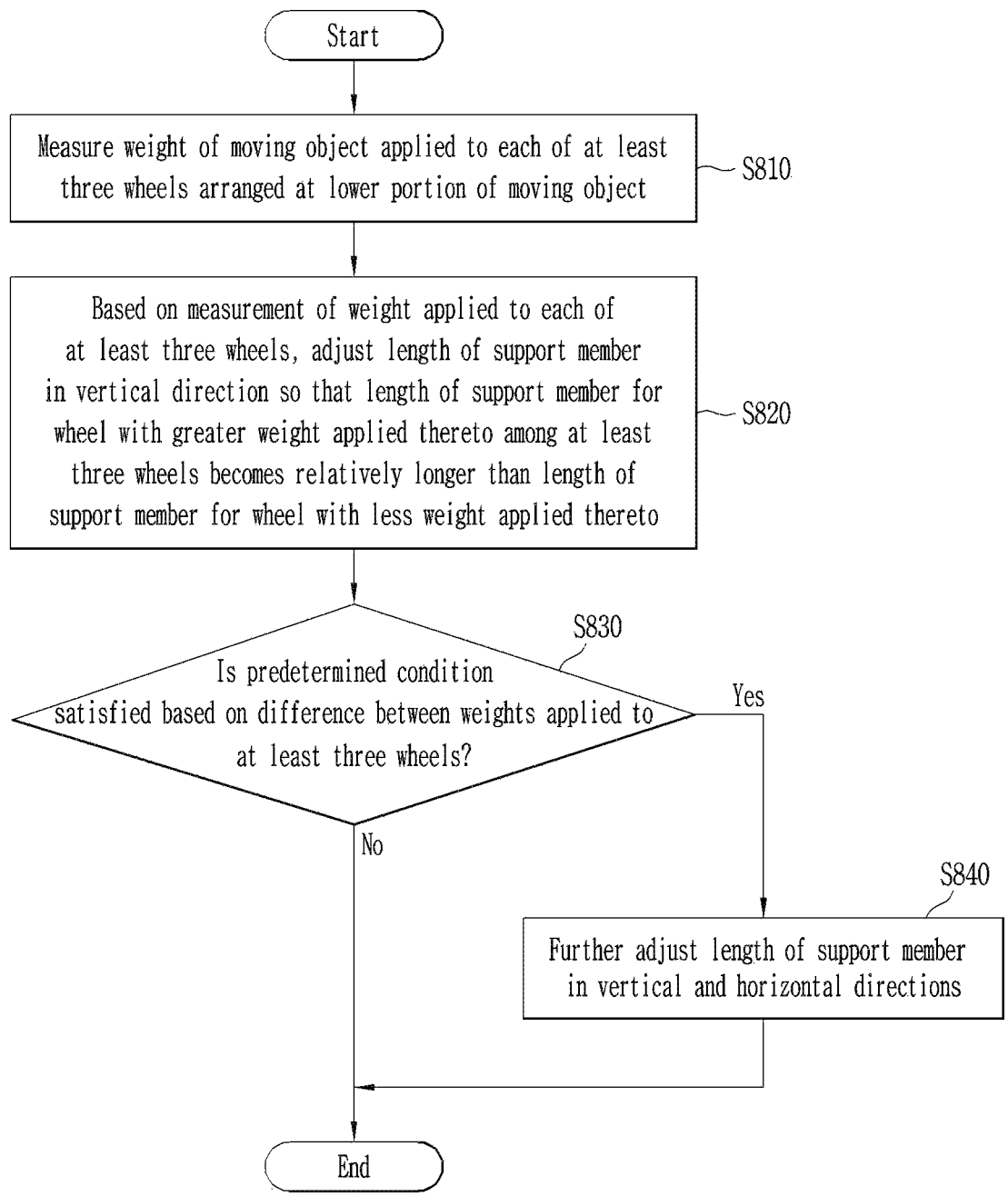
FIG. 8 is a flowchart of a procedure of determining whether to adjust a support member in a horizontal direction by comparing a first threshold value for weights applied to at least three wheels.

FIG. 8 is a flowchart of a procedure of determining whether to adjust a support member in a horizontal direction by comparing a first threshold value for weights applied to at least three wheels.

In step S810, a mobile robot 600 may measure weights of the mobile robot 600 applied to at least three wheels 610, arranged at a lower portion of the mobile robot 600, through the sensing unit 620 according to an embodiment of the present invention.

In step S820, based on a measurement of a weight applied to each of the at least three wheels 610, the mobile robot 600 may adjust a length of the support member 630 in a vertical direction so that a length of the support member 630 for a wheel with a greater weight applied thereto among the at least three wheels 610 becomes relatively longer than a length of a support member 630 for a wheel with a less weight applied thereto.

Features of steps S810 and S820 may be identical or similar to features of steps S410 and S420 in FIG. 4, and thus, detailed descriptions thereof are herein omitted.

In step S830, the mobile robot 600 may determine as to whether a predetermined condition is satisfied based on a difference between weights applied to the at least three wheels 610. According to an embodiment, the predetermined condition may be related to a degree of the difference between the weights applied to the at least three wheels 610. For example, the predetermined condition may be about whether or not a difference between a maximum value and a minimum value of the weights applied to the at least three wheels 610 exceeds a predetermined threshold weight or whether a ratio between the maximum value and the minimum value exceeds a predetermined threshold ratio. The predetermined threshold weight or the predetermined threshold ratio corresponds to a situation in which the difference between the maximum value and the minimum value of the weights applied to the at least three wheels 610 is greater than when the length of the support member 630 can be adjusted only in the vertical direction. That is, the predetermined condition may indicate a state in which the center of mass of the mobile robot 600 is still instable depending on inclination of a ground surface on which the mobile robot 600 is positioned even though the length of the support member 630 is adjusted in the vertical direction. For this reason, based on whether the predetermined condition is satisfied, a processor 650 may determine as to whether to further adjust the support member 630 in a horizontal direction using the second length adjustment member 642. According to an embodiment, a point in time when the processor 650 determines whether the predetermined condition is satisfied may be a point in time when length adjustment of the support member 630 is initiated, a point in time when the length adjustment of the support member 630 is completed, or a random point in time between the initiation point in time and the completion point in time. The predetermined condition may be determined with reference to a point in time when the length of the support member 630 is adjusted only in the vertical direction, and may be determined with reference to a point in time prior to the point in time when the length of the support member 630 is adjusted only in the vertical direction.

According to an embodiment, the processor 650 may determine whether a predetermined condition is satisfied when a weight is biased toward at least one wheel, based on measurement by the sensing unit 620 as to weight at each of the at least three wheels 610. For example, as the mobile robot 600 is positioned on an uphill slope, a center of mass of the mobile robot 600 may be biased toward any portion in a rear section. In this case, a weight measured by the sensing unit 620 may be biased toward to at least one wheel arranged in the rear section of the mobile robot 600 among the at least three wheels 610. Thus, depending on whether a biased degree satisfies a predetermined condition (for example, whether a sum of a weight applied to at least one wheel arranged in the rear section exceeds two times of a sum of a weight applied to at least one wheel arranged in the front section), the processor 650 may determine as to whether to terminate a length adjustment process or additionally adjust the length of the support member 630 in the vertical direction and the horizontal direction after adjusting the length of the support member 630 only in the vertical direction.

In step S830, if the predetermined condition is satisfied based on a a difference between the weights applied to the at least three wheels, the mobile robot 600 may additionally adjust the length of the support member 630 in the vertical direction or the horizontal direction in step S840.

Figure 9A:
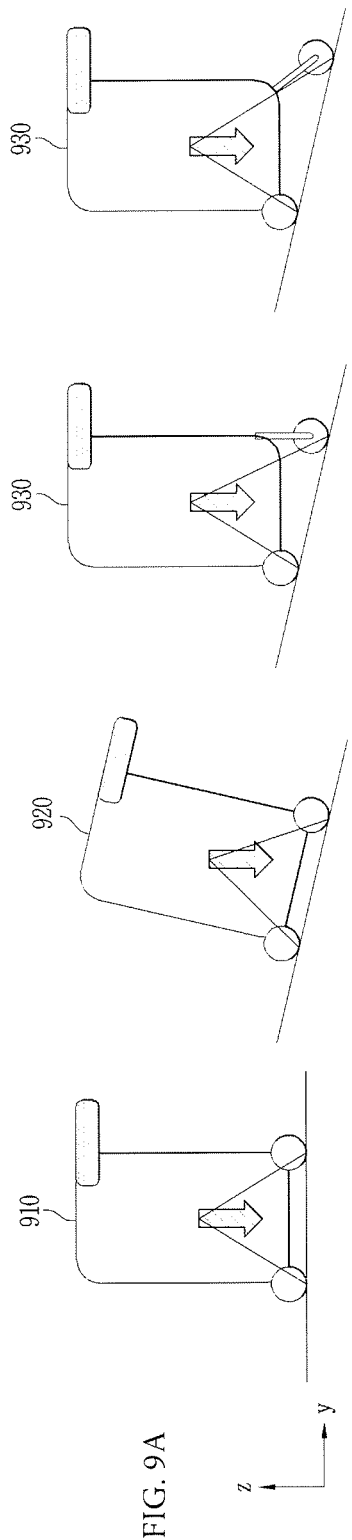
FIGS. 9A and 9B illustrate a procedure of controlling a center of mass by further adjusting a height of a support member for a wheel in vertical and horizontal directions by a mobile robot.
Figure 9B:
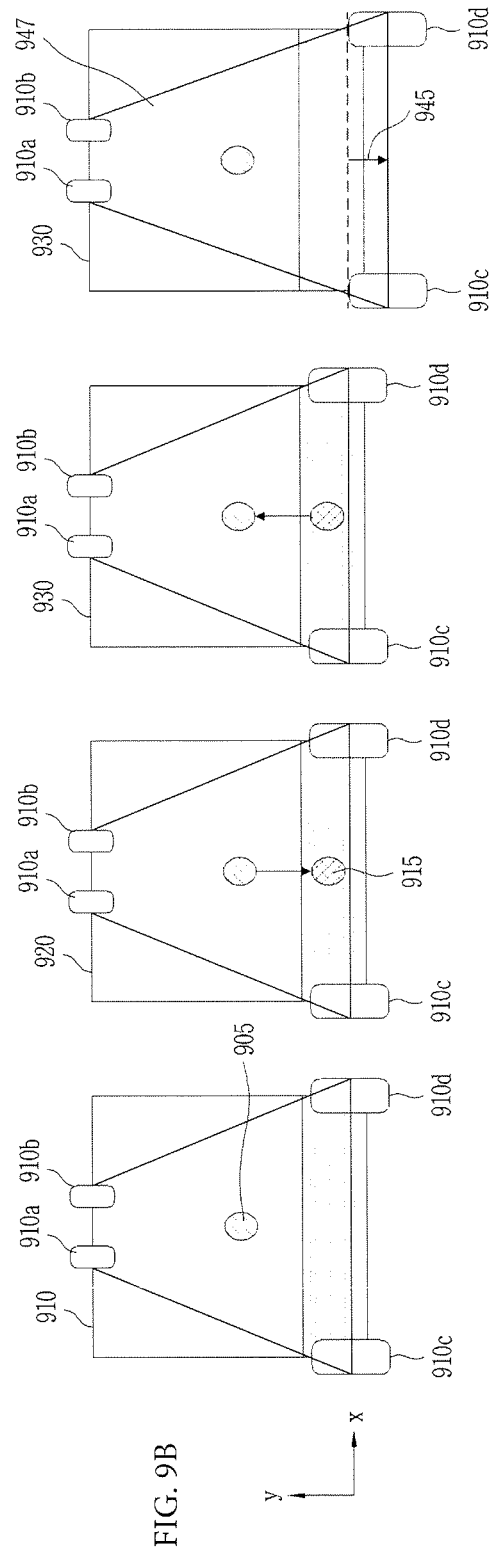

FIGS. 9A and 9B illustrate a procedure of controlling a center of mass by further adjusting a height of a support member 630 for a wheel 610 in vertical and horizontal directions by the mobile robot 600.

According to an embodiment, FIG. 9A illustrates the mobile robot 600 viewed from a side when the mobile robot 600 is moving from a level ground to an uphill slope, and FIG. 9B illustrates the mobile robot 600 viewed from a plane in the same situation. Mobile robots 910, 920, 930 and 940 in states shown in FIG. 9 may correspond to the mobile robot 600 of FIG. 6.

According to an embodiment, wheels 910a, 910b, 910c, and 910d of the mobile robot 910 moving on a level ground are horizontal to each other, and a center of mass 905 of the mobile robot 910 may be positioned in a region that connect the wheels 910a, 910b, 910c, and 910d when the mobile robot 910 is viewed from above in a vertical direction.

According to an embodiment, the mobile robot 920 may be positioned on an uphill slope. In this case, the mobile robot 920 may be positioned on a slope with inclination steeper than the uphill slope shown in FIG. 5. According to another embodiment, even on the uphill slope with the same inclination as shown in FIG. 5, the weight of the mobile robot 920 may be biased toward the rear section. As such, weights applied to the wheels 910c and 910d arranged in the rear section may be greater than weights applied to the wheels 910a and 910b arranged in the front section (or vice versa), and it is because the weights applied to the wheels 910a and 910b arranged in the front section are reduced whilst the weights applied to the wheels 910c and 910d arranged in the rear section are increased. As such, a center of mass 915 of the mobile robot having entered the uphill slope may be biased rearward further than the center of mass 905 of the mobile robot 920 positioned on a level ground, and this may be determined by the processor 650 on the basis of the fact that the weights applied to the wheels 910c and 910d arranged in the rear section are relatively greater than the weights applied to the wheels 910a and 910b arranged in the front section.

According to an embodiment, the mobile robot 930 may adjust a tilted posture of the mobile robot 930 by extending a length of a support member 630 for the rear section wheels 910c and 910d with the relatively greater weight applied thereto. To this end, the processor 650 may control the length adjustment member 640 so that the center of mass 915 of the mobile robot 930 positioned on the uphill slope can move to the center of mass 905 on the level ground.

According to an embodiment, when it is determined that a predetermined condition is satisfied based on weights applied to at least three wheels 610 measured by a sensing unit 620, the processor 650 may control a second length adjustment member 642 to adjust a length of a support member 630 in a horizontal direction. According to an embodiment, as the length of the support member 630 having adjusted only in the vertical direction is capable of being adjusted in a horizontal direction as well through operation of the second length adjustment member 642, an area 947 in which the at least three wheels 610 are arranged may become wider when the mobile robot 600 is viewed from a plane. As shown in FIG. 9B, due to horizontal length adjustment 946 of the support member 630 by the second length adjustment member 942 of the mobile robot 940, the area 947 formed by the at least wheels 910a, 910b, 910c, and 910d may become wider, and accordingly, the mobile robot 940 may stably keep in balance.

According to an embodiment, depending on inclination of a ground surface on which the mobile robot 940 is positioned, the length of the support member 630 may be further adjusted in the vertical direction by the first length adjustment member 641 in a procedure of adjusting the length of the support member 630 in the horizontal direction by the second length adjustment member 642.

FIG. 10 is a flowchart of a procedure of determining whether to adjust a length of a support member 230 based on weights applied to at least three wheels 210 of a mobile robot 200 according to an embodiment of the present invention.

In step S1010, the mobile robot 200 according to an embodiment of the present invention may measure weights applied to each of at least three wheels 210 arranged at a lower portion of the mobile robot 200 by use of the sensing unit 220. The characteristic of the step S1010 in FIG. 10 may be identical or similar to the characteristic of the step S410 in FIG. 4, and thus, a detailed description thereof is herein omitted.

According to an embodiment, the mobile robot 200 may determine in step S1015 as to whether a difference between the weights applied to the at least three wheels 210 falls within a predetermined range and lasts for a period exceeding a predetermined threshold time. According to an embodiment, if a difference between weights 210 measured when the mobile robot 100 shakes during movement or moves over a low-height protruding surface (for example, a berm) lasts for a short period of time, it may be preferable not to perform the above-described steps for changing a center of mass. Thus, only when the difference between weights applied to the wheels 210 falls within a predetermined range and the difference lasts for a period exceeding a predetermined threshold time, the processor 250 may control the length adjustment member 240 to control a length of the support member 230.

In this regard, FIGS. 11A, 11B, and 11C are diagrams for comparing a case where the length of the support member 230 is determined to be adjustable according to an embodiment and a case where the length of the support member 230 is determined to be adjustable.

According to an embodiment, referring to FIG. 11A, a difference between weights applied to the at least three wheels 210 of the mobile robot 200 falls within a range exceeding a predetermined weight A (for example, a difference between a weight applied to at least one wheel arranged in a front section of the mobile robot 200 and a weight applied to at least one wheel arranged in a rear section of the mobile robot 200 or a difference between a maximum value and a minimum value of a weight applied to the at least three wheels 210) falls within a range exceeding a predetermined weight A and lasts for a period 1152 exceeding a threshold time 1150. In this case, the mobile robot 200 may determine in step S1015 that a difference between the weights applied to the at least three wheels falls within the predetermined range and lasts for a period exceeding a predetermined threshold time.

According to an embodiment, referring to FIG. 11B, the difference between the weights applied to the at least three wheels 210 of the mobile robot 200 does not exceed the predetermined weight A. In this case, the mobile robot 200 may determine in step S1015 that the difference between the weights applied to the at least three wheels 210 of the mobile robot 200 falls within a predetermined range and does not last for a period exceeding the predetermined threshold time 1150.

According to an embodiment, referring to FIG. 11C, the difference between the weights applied to the at least three wheels 210 of the mobile robot 200 exceeds the predetermined weight A, but a period 1154 for which the difference exceeds the predetermined weight A does not exceeds the threshold time 1150. In this case, the mobile robot may determine in step S1015 that the difference between the weights applied to the at least three wheels 210 falls within the predetermined range and does not last for a period exceeding the predetermined threshold time 1150.

According to an embodiment, in step S1020, if the difference between the weights applied to the at least three wheels 210 exists and lasts for a period exceeding the predetermined threshold time, the mobile robot 200 may control the length adjustment member 240 to adjust the length of the support member 230 in the vertical direction. The characteristic of step S1020 in FIG. 10 may correspond to step S420 in FIG. 4, and thus, a detailed description thereof is herein omitted.

Figure 12:
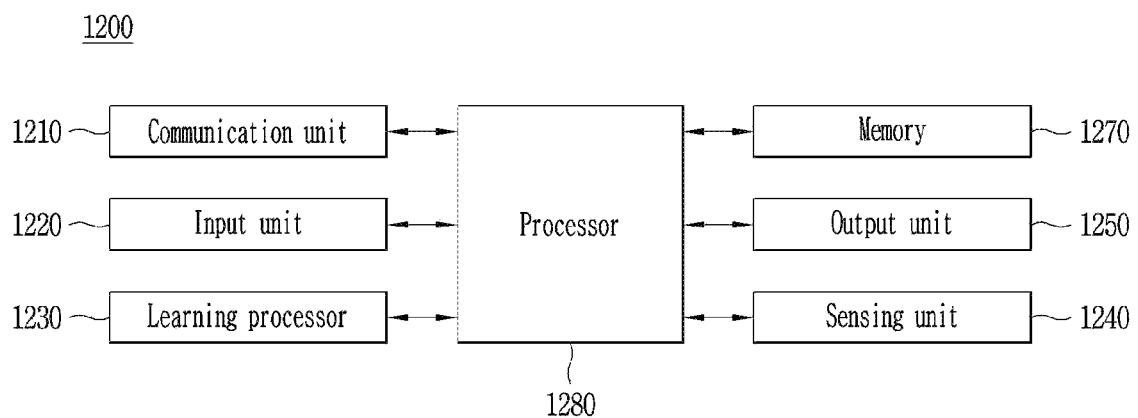
FIG. 12 shows an Artificial Intelligence (AI) device according to an embodiment of the present invention.

FIG. 12 illustrates an AI device 1200 according to an embodiment of the present disclosure.

AI device 1200 of FIG. 12 may correspond to mobile robot 200 of FIG. 2, and some of constituent elements of FIG. 12, which are not included in mobile robot 200 of FIG. 2, may be selectively adopted within a range in which the embodiments of the present disclosure may be realized.

AI device 1200 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 12, AI device 1200 may include a communication unit 1210, an input unit 1220, a learning processor 1230, a sensing unit 1240, an output unit 1250, a memory 1270, and a processor 1280, for example.

Communication unit 1210 may transmit and receive data to and from external devices, such as other AI devices 1400a to 1400e and an AI server 1300, using wired/wireless communication technologies. For example, communication unit 1210 may transmit and receive sensor information, user input, learning models, and control signals, for example, to and from external devices.

At this time, the communication technology used by communication unit 1210 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 1220 may acquire various types of data.

At this time, input unit 1220 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 1220 may acquire, for example, input data to be used when acquiring an output using learning data for model learning and a learning model. Input unit 1220 may acquire unprocessed input data, and in this case, processor 1280 or learning processor 1230 may extract an input feature as pre-processing for the input data.

Learning processor 1230 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, learning processor 1230 may perform AI processing along with a learning processor 1340 of AI server 1300.

At this time, learning processor 1230 may include a memory integrated or embodied in AI device 1200. Alternatively, learning processor 1230 may be realized using memory 1270, an external memory directly coupled to AI device 1200, or a memory held in an external device.

Sensing unit 1240 may acquire at least one of internal information of AI device 1200, environmental information around AI device 1200, and user information using various sensors.

At this time, the sensors included in sensing unit 1240 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and a temperature sensor, for example.

Output unit 1250 may generate, for example, a visual output, an auditory output, or a tactile output.

At this time, output unit 1250 may include, for example, a display that outputs visual information, a speaker that outputs auditory information, and a haptic module that outputs tactile information.

Memory 1270 may store data which assists various functions of AI device 1200. For example, memory 1270 may store input data acquired by input unit 1220, learning data, learning models, and learning history, for example.

Processor 1280 may determine at least one executable operation of AI device 1200 based on information determined or generated using a data analysis algorithm or a machine learning algorithm. Then, processor 1280 may control constituent elements of AI device 1200 to perform the determined operation.

To this end, processor 1280 may request, search, receive, or utilize data of learning processor 1230 or memory 1270, and may control the constituent elements of AI device 1200 so as to execute a predictable operation or an operation that is deemed desirable among the at least one executable operation.

At this time, when connection of an external device is required to perform the determined operation, processor 1280 may generate a control signal for controlling the external device and may transmit the generated control signal to the external device.

Processor 1280 may acquire intention information with respect to user input and may determine a user request based on the acquired intention information.

At this time, processor 1280 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by learning processor 1230, may have learned by learning processor 1340 of AI server 1300, or may have learned by distributed processing of these processors.

Processor 1280 may collect history information including, for example, the content of an operation of AI device 1200 or feedback of the user with respect to an operation, and may store the collected information in memory 1270 or learning processor 1230, or may transmit the collected information to an external device such as AI server 1300. The collected history information may be used to update a learning model.

Processor 1280 may control at least some of the constituent elements of AI device 1200 in order to drive an application program stored in memory 1270.

Moreover, processor 1280 may combine and operate two or more of the constituent elements of AI device 1200 for the driving of the application program.

Figure 13:
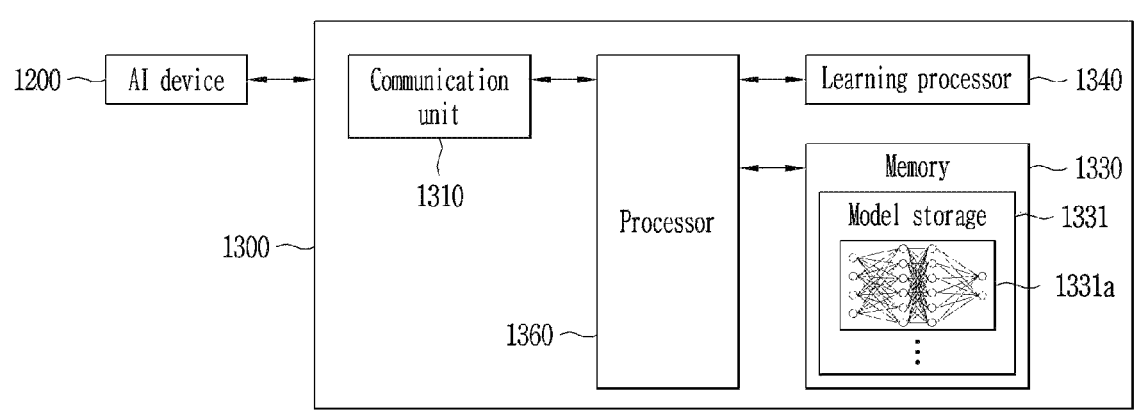
FIG. 13 shows an AI server according to an embodiment of the present invention.

FIG. 13 illustrates AI server 1300 according to an embodiment of the present disclosure.

Referring to FIG. 13, AI server 1300 may refer to a device that causes an artificial neural network to learn using a machine learning algorithm or uses the learned artificial neural network. Here, AI server 1300 may be constituted of multiple servers to perform distributed processing, and may be defined as a 5G network. At this time, AI server 1300 may be included as a constituent element of AI device 1200 so as to perform at least a part of AI processing together with the AI device.

AI server 1300 may include a communication unit 1310, a memory 1330, learning processor 1340, and a processor 1360, for example.

Communication unit 1310 may transmit and receive data to and from an external device such as AI device 1200.

Memory 1330 may include a model storage unit 1331. Model storage unit 1331 may store a model (or an artificial neural network) 1331*a* which is learning or has learned via learning processor 1340.

Learning processor 1340 may cause artificial neural network 1331*a* to learn learning data. A learning model may be used in the state of being mounted in AI server 1300 of the artificial neural network, or may be used in the state of being mounted in an external device such as AI device 1200.

The learning model may be realized in hardware, software, or a combination of hardware and software. In the case in which a part or the entirety of the learning model is realized in software, one or more instructions constituting the learning model may be stored in memory 1330.

Processor 1360 may deduce a result value for newly input data using the learning model, and may generate a response or a control instruction based on the deduced result value.

Figure 14:
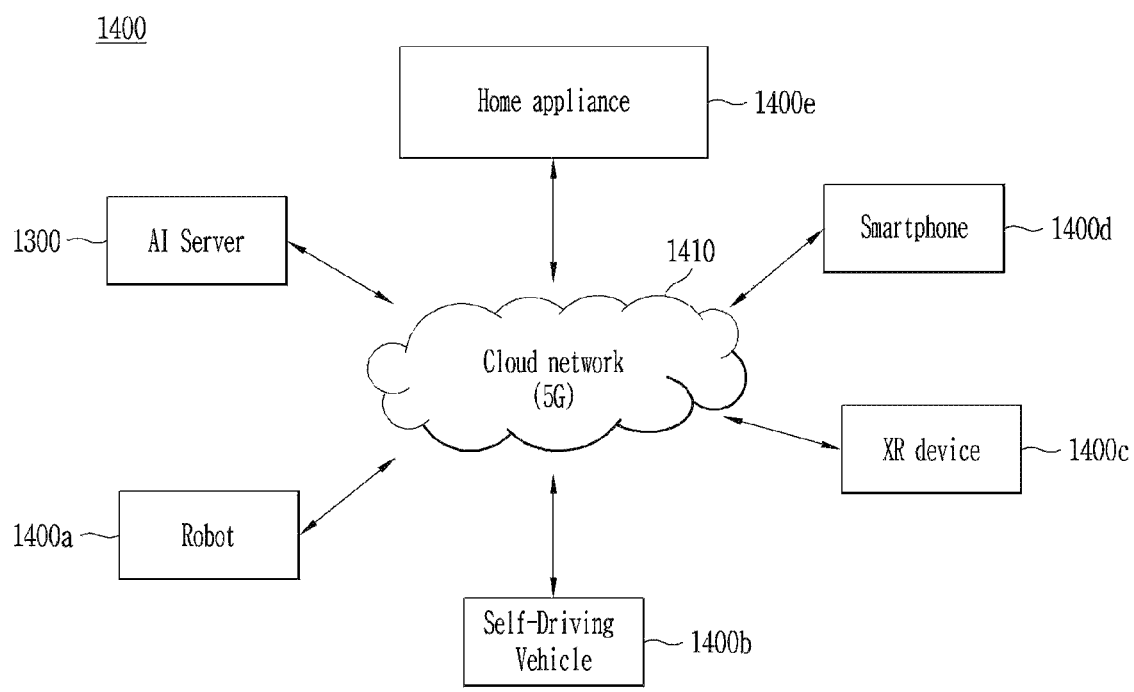
FIG. 14 shows an AI system according to an embodiment of the present invention.

FIG. 14 illustrates an AI system 1400 according to an embodiment of the present disclosure.

Referring to FIG. 14, in AI system 1400, at least one of AI server 1300, a robot 1400*a*, an autonomous vehicle 1400*b*, an XR device 1400*c*, a smart phone 1400*d*, and a home appliance 1400*e* is connected to a cloud network 1410. Here, robot 1400*a*, autonomous vehicle 1400*b*, XR device 1400*c*, smart phone 1400*d*, and home appliance 1400*e*, to which AI technologies are applied, may be referred to as AI devices 1400*a* to 1400*e*.

Cloud network 1410 may constitute a part of a cloud computing infra-structure, or may refer to a network present in the cloud computing infra-structure. Here, cloud network 1410 may be configured using a 3G network, a 4G or long term evolution (LTE) network, or a 5G network, for example.

That is, respective devices 1400*a* to 1400*e* and 1300 constituting AI system 1400 may be connected to each other via cloud network 1410. In particular, respective devices 1400*a* to 1400*e* and 1300 may communicate with each other via a base station, or may perform direct communication without the base station.

AI server 1300 may include a server which performs AI processing and a server which performs an operation with respect to big data.

AI server 1300 may be connected to at least one of robot 1400*a*, autonomous vehicle 1400*b*, XR device 1400*c*, smart phone 1400*d*, and home appliance 1400*e*, which are AI devices constituting AI system 1400, via cloud network 1410, and may assist at least a part of AI processing of connected AI devices 1400*a* to 1400*e*.

At this time, instead of AI devices 1400*a* to 1400*e*, AI server 1300 may cause an artificial neural network to learn according to a machine learning algorithm, and may directly store a learning model or may transmit the learning model to AI devices 1400*a* to 1400*e*.

At this time, AI server 1300 may receive input data from AI devices 1400*a* to 1400*e*, may deduce a result value for the received input data using the learning model, and may generate a response or a control instruction based on the deduced result value to transmit the response or the control instruction to AI devices 1400*a* to 1400*e*.

Alternatively, AI devices 1400*a* to 1400*e* may directly deduce a result value with respect to input data using the learning model, and may generate a response or a control instruction based on the deduced result value.

Hereinafter, various embodiments of AI devices 1400*a* to 1400*e*, to which the above-described technology is applied, will be described. Here, AI devices 1400*a* to 1400*e* illustrated in FIG. 14 may be specific embodiments of AI device 1200 illustrated in FIG. 12.

Robot 1400*a* may be realized into a guide robot, a transportation robot, a cleaning robot, a wearable robot, an entertainment robot, a pet robot, or an unmanned flying robot, for example, through the application of AI technologies.

Robot 1400*a* may include a robot control module for controlling an operation, and the robot control module may refer to a software module or a chip realized in hardware.

Robot 1400*a* may acquire information on the state of robot 1400*a* using sensor information acquired from various types of sensors, may detect (recognize) the surrounding environment and an object, may generate map data, may determine a movement route and a driving plan, may determine a response with respect to user intersection, or may determine an operation.

Here, robot 1400*a* may use sensor information acquired from at least one sensor among a lidar, a radar, and a camera in order to determine a movement route and a driving plan.

Robot 1400*a* may perform the above-described operations using a learning model configured with at least one artificial neural network. For example, robot 1400*a* may recognize the surrounding environment and the object using the learning model, and may determine an operation using the recognized surrounding environment information or object information. Here, the learning model may be directly learned in robot 1400*a*, or may be learned in an external device such as AI server 1300.

At this time, robot 1400*a* may directly generate a result using the learning model to perform an operation, but may transmit sensor information to an external device such as AI server 1300 and receive a result generated by the external device to perform an operation.

Robot 1400*a* may determine a movement route and a driving plan using at least one of map data, object information detected from sensor information, and object information acquired from an external device, and a drive unit may be controlled to drive robot 1400*a* according to the determined movement route and driving plan.

The map data may include object identification information for various objects arranged in a space along which robot 1400*a* moves. For example, the map data may include object identification information for stationary objects, such as the wall and the door, and movable objects such as a flowerpot and a desk. Then, the object identification information may include names, types, distances, and locations, for example.

In addition, robot 1400*a* may perform an operation or may drive by controlling the drive unit based on user control or interaction. At this time, robot 1400*a* may acquire interactional intention information depending on a user operation or voice expression, and may determine a response based on the acquired intention information to perform an operation.

Autonomous vehicle 1400*b* may be realized into a mobile robot, a vehicle, or an unmanned air vehicle, for example, through the application of AI technologies.

Autonomous vehicle 1400*b* may include an autonomous driving control module for controlling an autonomous driving function, and the autonomous driving control module may mean a software module or a chip realized in hardware. The autonomous driving control module may be a constituent element included in autonomous vehicle 1400*b*, but may be a separate hardware element outside autonomous vehicle 1400*b* so as to be connected thereto.

Autonomous vehicle 1400*b* may acquire information on the state of autonomous vehicle 1400*b* using sensor information acquired from various types of sensors, may detect (recognize) the surrounding environment and an object, may generate map data, may determine a movement route and a driving plan, or may determine an operation.

Here, autonomous vehicle 1400*b* may use sensor information acquired from at least one sensor among a lidar, a radar, and a camera in the same manner as robot 1400*a* in order to determine a movement route and a driving plan.

In particular, autonomous vehicle 1400*b* may recognize the environment or an object with respect to an area outside the field of vision or an area located at a predetermined distance or more by receiving sensor information from external devices, or may directly receive recognized information from external devices.

Autonomous vehicle 1400*b* may perform the above-described operations using a learning model configured with at least one artificial neural network. For example, autonomous vehicle 1400*b* may recognize the surrounding environment and the object using the learning model, and may determine a driving line using the recognized surrounding environment information or object information. Here, the learning model may be directly learned in autonomous vehicle 1400*b*, or may be learned in an external device such as AI server 1300.

At this time, autonomous vehicle 1400*b* may generate a result using the learning model to perform an operation, but may transmit sensor information to an external device such as AI server 1300 and receive a result generated by the external device to perform an operation.

Autonomous vehicle 1400*b* may determine a movement route and a driving plan using at least one of map data, object information detected from sensor information, and object information acquired from an external device, and a drive unit may be controlled to drive autonomous vehicle 1400*b* according to the determined movement route and driving plan.

The map data may include object identification information for various objects arranged in a space (e.g., a road) along which autonomous vehicle 1400*b* drives. For example, the map data may include object identification information for stationary objects, such as streetlights, rocks, and buildings, and movable objects such as vehicles and pedestrians. Then, the object identification information may include names, types, distances, and locations, for example.

In addition, autonomous vehicle 1400*b* may perform an operation or may drive by controlling the drive unit based on user control or interaction. At this time, autonomous vehicle 1400*b* may acquire interactional intention information depending on a user operation or voice expression, and may determine a response based on the acquired intention information to perform an operation.

XR device 1400*c* may be realized into a head-mount display (HMD), a head-up display (HUD) provided in a vehicle, a television, a cellular phone, a smart phone, a computer, a wearable device, a home appliance, a digital signage, a vehicle, a stationary robot, or a mobile robot, for example, through the application of AI technologies.

XR device 1400*c* may obtain information on the surrounding space or a real object by analyzing three-dimensional point cloud data or image data acquired from various sensors or an external device to generate positional data and attribute data for three-dimensional points, and may output an XR object by rendering the XR object to be output. For example, XR device 1400c may output an XR object including additional information about a recognized object so as to correspond to the recognized object.

XR device 1400c may perform the above-described operations using a learning model configured with at least one artificial neural network. For example, XR device 1400c may recognize a real object from three-dimensional point cloud data or image data using a learning model, and may provide information corresponding to the recognized real object. Here, the learning model may be directly learned in XR device 1400c, or may be learned in an external device such as AI server 1300.

At this time, XR device 1400c may directly generate a result using the learning model to perform an operation, but may transmit sensor information to an external device such as AI server 1300 and receive the generated result to perform an operation.

Robot 1400a may be realized into a guide robot, a transportation robot, a cleaning robot, a wearable robot, an entertainment robot, a pet robot, or an unmanned flying robot, for example, through the application of AI technologies and autonomous driving technologies.

Robot 1400a to which the AI technologies and the autonomous driving technologies are applied may refer to, for example, a robot having an autonomous driving function, or may refer to robot 1400a which interacts with autonomous vehicle 1400b.

Robot 1400a having an autonomous driving function may collectively refer to devices that move by themselves along a given moving line without user control, or move by determining a moving line by themselves.

Robot 1400a and autonomous vehicle 1400b, which have an autonomous driving function, may use a common sensing method in order to determine at least one of a movement route or a driving plan. For example, robot 1400a and autonomous vehicle 1400b, which have an autonomous driving function, may determine at least one of the movement route or the driving plan using information sensed by a lidar, a radar, and a camera.

Robot 1400a, which interacts with autonomous vehicle 1400b, may be provided separately from autonomous vehicle 1400b so as to be connected to the autonomous driving function of autonomous vehicle 1400b inside or outside autonomous vehicle 1400b, or may perform an operation associated with a user who has got on autonomous vehicle 1400b.

At this time, robot 1400a, which interacts with autonomous vehicle 1400b, may acquire sensor information instead of autonomous vehicle 1400b to provide the information to autonomous vehicle 1400b, or may acquire sensor information and generate surrounding environment information or object information to provide the information to autonomous vehicle 1400b, thereby controlling or assisting the autonomous driving function of autonomous vehicle 1400b.

Alternatively, robot 1400a, which interacts with autonomous vehicle 1400b, may monitor the user who has got on autonomous vehicle 1400b or may control the functions of autonomous vehicle 1400b via interaction with the user. For example, when it is determined that a driver is in a drowsy state, robot 1400a may activate the autonomous driving function of autonomous vehicle 1400b or may assist the control of a drive unit of autonomous vehicle 1400b. Here, the functions of autonomous vehicle 1400b controlled by robot 1400a may include not only the autonomous driving function, but also a function provided in a navigation system or an audio system provided in autonomous vehicle 1400b.

Alternatively, robot 1400a, which interacts with autonomous vehicle 1400b, may provide information to autonomous vehicle 1400b or assist the function thereof at the outside of autonomous vehicle 1400b. For example, robot 1400a may serve as a smart traffic light that provides traffic information including, for example, traffic signal information to autonomous vehicle 1400b, or may serve as an automatic electric charging unit of an electric vehicle that may interact with autonomous vehicle 1400b and may be automatically connected to a charge port of the vehicle.

Robot 1400a may be realized into a guide robot, a transportation robot, a cleaning robot, a wearable robot, an entertainment robot, a pet robot, an unmanned flying robot, or a drone, for example, through the application of AI technologies and XR technologies.

Robot 1400a, to which the XR technologies are applied, may refer to a robot which is a control or interaction target in an XR image. In this case, robot 1400a may be provided separately from XR device 1400c and may operate in cooperation with XR device 1400c.

When robot 1400a, which is a control or interaction target in an XR image, acquires sensor information from sensors including a camera, robot 1400a or XR device 1400c may generate an XR image based on the sensor information, and XR device 1400c may output the generated XR image. Then, such robot 1400a may operate based on a control signal input through XR device 1400c or via intersection with the user.

For example, the user may check the XR image corresponding to the viewpoint of robot 1400a, which is remotely linked, via an external device such as XR device 1400c, and may adjust an autonomous driving route of robot 1400a or control an operation or driving thereof via interaction with the robot, or may check information on an object around thereof.

Autonomous vehicle 1400b may be realized into a mobile robot, a vehicle, or an unmanned air vehicle, for example, through the application of the AI technologies and the XR technologies.

Autonomous vehicle 1400b, to which the XR technologies are applied, may refer to an autonomous vehicle having an XR image providing device, or may refer to an autonomous vehicle as a control or interaction target in an XR image, for example. Particularly, autonomous vehicle 1400b as a control or interaction target in an XR image may be provided separately from XR device 1400c and may operate in cooperation with XR device 1400c.

Autonomous vehicle 1400b having the XR image providing device may acquire sensor information from sensors including a camera, and may output an XR image generated based on the acquired sensor information. For example, autonomous vehicle 1400b may include an HUD to output an XR image, thereby providing an occupant with an XR object corresponding to a real object or an object in the screen.

At this time, when the XR object is output to the HUD, at least a portion of the XR object may be output so as to overlap with a real object to which the passenger's gaze is directed. On the other hand, when the XR object is output to a display provided in autonomous vehicle 1400b, at least a portion of the XR object may be output so as to overlap with an object in the screen. For example, autonomous vehicle 1400b may output XR objects corresponding to objects such as a lane, another vehicle, a traffic light, a traffic sign, a two-wheeled vehicle, a pedestrian, and a building.

When autonomous vehicle 1400*b* as a control or interaction target in an XR image acquires sensor information from sensors including a camera, autonomous vehicle 1400*b* or XR device 1400*c* may generate an XR image based on the sensor information, and XR device 1400*c* may output the generated XR image. Then, autonomous vehicle 1400*b* may operate based on a control signal input through an external device such as XR device 1400*c* or via interaction with the user.

The above-described method according to the present disclosure may be provided as a program to be executed in a computer and may be recorded on a computer readable recording medium.

The method according to the present disclosure may be executed via software. When executed via software, the constituent elements of the present disclosure are code segments that execute required operations. The program or the code segments may be stored in a processor readable medium.

The computer readable recording medium includes all kinds of recording devices in which data is stored in a computer readable manner. Examples of the computer readable recording device include a ROM, a RAM, a CD-ROM, a DVD-ROM, a DVD-RAM, a magnetic tape, a floppy disc, a hard disc, and an optical data storage device. In addition, the computer readable recording medium may be distributed in a computer device connected thereto via a network so that a computer readable code may be stored and executed in a distribution manner.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A mobile robot comprising:
    at least three wheels arranged at a lower portion of the mobile robot;
    a sensing unit configured to measure a weight of the mobile robot applied to each of the at least three wheels;
    a support member connected to at least one of the at least three wheels so as to support the mobile robot;
    a length adjustment member connected to the support member so as to adjust a length of the support member in a vertical direction of a ground surface on which the mobile robot is positioned; and
    a processor configured to measure a weight applied to each of the at least three wheels by use of the sensing unit and control the length adjustment member so that a length of a support member for a wheel with a greater weight applied thereto among the at least three wheels becomes relatively longer than a length of a support member for a wheel with a less weight applied thereto.

2. The mobile robot of claim 1, wherein the processor is configured to control the length adjustment member so that equal weights are applied to the at least three wheels.

3. The mobile robot of claim 1,
    wherein driving power is capable of being provided to the at least one of the at least three wheels, and
    wherein the processor is configured to control the length adjustment member so as to adjust a length of a support member for the wheel to which the driving power is provided.

4. The mobile robot of claim 1,
    wherein the length adjustment member comprises:
    a first length adjustment member for adjusting the length of the support member in the vertical direction; and
    a second length adjustment member for adjusting the length of the support member in a horizontal direction,
    wherein the processor is configured to control the first length adjustment member and the second length adjustment member so that the support member is adjusted in the vertical and horizontal directions, and
    wherein the mobile robot further comprises a hinge part that changes an angle of the support member upon length adjustment of the support member through operations of the first length adjustment member and the second adjustment member.

5. The mobile robot of claim 4, wherein the processor is configured to, when a predetermined condition is satisfied based on a difference between the weights applied to the at least three wheels, further adjust the length of the support member in the vertical and horizontal directions.

6. The mobile robot of claim 1, wherein the processor is configured to, when a difference between the weights applied to the at least three wheels falls within a predetermined range and lasts for a period exceeding a predetermined threshold time, control the length adjustment member.

7. A method for controlling a center of mass of a mobile robot, the method comprising:
    measuring a weight of the mobile robot applied to each of at least three wheels arranged at a lower portion of the mobile robot; and
    based on measurements of the weight applied to each of the at least three wheels, adjusting a length of a support member in a vertical direction so that a length of a support member for a wheel with a greater weight applied thereto among the at least three wheels becomes relatively longer than a length of a support member with a less weight applied thereto.

8. The method of claim 7, wherein the adjusting of the length of the support member further comprises adjusting the length of the support member so that equal weights are applied to the at least three wheels.

9. The method of claim 7, wherein the adjusting of the length of the support member further comprises adjusting the length of the support member in vertical and horizontal directions.

10. The method of claim 9, wherein the adjusting of the length of the support member in the vertical and horizontal directions comprises:
    determining as to whether a predetermined condition is satisfied based on a difference between the weights applied to the at least three wheels; and
    when the predetermined condition is satisfied based on a difference between the weights applied to the at least three wheels, adjusting the length of the support member in the vertical and horizontal directions.

11. The method of claim 7, wherein the adjusting of the length of the support member comprises adjusting the length of the support member when a difference between the weights applied to the at least three wheels falls within a predetermined range and lasts for a period exceeding a predetermined threshold time.

12. A non-transitory computer readable storage medium in which a computer program for implementing the method of claim 7.

\* \* \* \* \*